US012620730B2

(12) United States Patent
Maleki et al.

(10) Patent No.: US 12,620,730 B2
(45) Date of Patent: May 5, 2026

(54) POWER MODULE COMPRISING POSITIONING STRUCTURES, ALIGNMENT TOOL AND METHOD FOR POSITIONING AND ALIGNING THE POWER MODULE

(71) Applicant: Hitachi Energy Ltd, Zürich (CH)

(72) Inventors: Milad Maleki, Untersiggenthal (CH); Dominik Truessel, Bremgarten (CH); Fabian Fischer, Baden (CH); Lluis Santolaria, Olten (CH)

(73) Assignee: Hitachi Energy Ltd, Zürich (CH)

( * ) Notice: Subject to any disclaimer, the term of this patent is extended or adjusted under 35 U.S.C. 154(b) by 428 days.

(21) Appl. No.: 18/128,847

(22) Filed: Mar. 30, 2023

(65) Prior Publication Data

US 2023/0411875 A1 Dec. 21, 2023

(30) Foreign Application Priority Data

Jun. 20, 2022 (EP) .................................... 22179823

(51) Int. Cl.
*H01R 43/20* (2006.01)
*H01R 12/52* (2011.01)

(52) U.S. Cl.
CPC ......... *H01R 12/523* (2013.01); *H01R 43/205* (2013.01)

(58) Field of Classification Search
CPC ................ H01R 12/523; H01R 43/205; H01L 2223/54426; H01L 2223/54486; H01L 23/544; H01L 21/68
See application file for complete search history.

(56) References Cited

U.S. PATENT DOCUMENTS

| | | | | |
|---|---|---|---|---|
| 5,773,320 | A | 6/1998 | Bayerer | |
| 2003/0081386 | A1* | 5/2003 | Robillard | H05K 7/183 312/223.1 |
| 2011/0306219 | A1 | 12/2011 | Swanger et al. | |
| 2014/0036453 | A1 | 2/2014 | Yan et al. | |
| 2020/0176351 | A1 | 6/2020 | Garg et al. | |
| 2020/0225067 | A1 | 7/2020 | Offermann | |
| 2020/0266757 | A1* | 8/2020 | Goldberg | H02S 20/24 |
| 2022/0406452 | A1* | 12/2022 | Shelton, IV | A61B 34/37 |
| 2023/0411875 | A1* | 12/2023 | Maleki | H01R 12/523 |

FOREIGN PATENT DOCUMENTS

| | | | |
|---|---|---|---|
| CN | 209282459 | U | 8/2019 |
| CN | 209948970 | U | 1/2020 |
| CN | 112016262 | A | 12/2020 |
| CN | 213184276 | U | 5/2021 |

(Continued)

*Primary Examiner* — Abdullah A Riyami
*Assistant Examiner* — Nelson R. Burgos-Guntin
(74) *Attorney, Agent, or Firm* — PROCOPIO, CORY, HARGREAVES & SAVITCH LLP

(57) ABSTRACT

A power module comprising at least one module component is provided. The power module has a side surface. The side surface of the power module comprises positioning structures. At least one of the positioning structures has a geometrical form configured for receiving an alignment tool and further configured for vertically moving the power module when sliding the alignment tool along a lateral direction. Moreover, an alignment tool and a method using the alignment tool for positioning and aligning the power module are provided.

20 Claims, 10 Drawing Sheets

(56) References Cited

FOREIGN PATENT DOCUMENTS

| | | | |
|---|---|---|---|
| DE | 102009025113 | A1 | 12/2010 |
| EP | 3499649 | A1 | 6/2019 |
| JP | 2000-260513 | A | 9/2000 |
| JP | 2009-4380 | A | 1/2009 |
| JP | 5871044 | B1 | 3/2016 |
| TW | M265803 | U | 5/2005 |

* cited by examiner

POWER MODULE COMPRISING POSITIONING STRUCTURES, ALIGNMENT TOOL AND METHOD FOR POSITIONING AND ALIGNING THE POWER MODULE

The present application claims priority to European Patent Application No. 22179823.4, filed on Jun. 20, 2022, which is hereby incorporated herein by reference as if set forth in full.

The present disclosure relates to a power module, an alignment tool and a method using the alignment tool for positioning and aligning the power module.

When implementing power modules, for instance power semiconductor modules, in various applications, the power modules shall be mechanically and electrically connected to control electronics like gate drivers or other integrated circuits configured for controlling the power modules. The control electronics can be arranged on an assembly board, such as on a control board or a printed circuit board. Such assembly board can be arranged on top of the power modules. The electrical connections between the power semiconductor module/s and the assembly board can be provided by auxiliary or control terminals of the power module/s. There is a need for exactly placing the power module/s relative to the position of the assembly board for facilitating the process of mechanically and electrically interconnecting the power module/s to the assembly board. Using an alignment tool may help in providing an efficient and simplified method for exactly placing the power module/s with respect to the position of the assembly board.

Embodiments of the disclosure, for instance as claimed in the independent claims, address the above shortcomings in the art in whole or in part. Further embodiments of the power module, the alignment tool and of the method for interconnecting the power module/s to an assembly board, for instance to a control board, are subject matter of the further claims.

According to an embodiment of a power module, it comprises at least one module component. The power module has a side surface, wherein the side surface of the power module comprises positioning structures. At least one of the positioning structures has a geometrical form configured for receiving an alignment tool, for example an alignment structure of the alignment tool. The at least one positioning structure can be further configured for vertically moving the power module when sliding the alignment tool along a lateral direction.

The power module can comprise a carrier, wherein the at least one module component is arranged on the carrier. The side surface of the power module can be formed partially by a side surface of the carrier and partially by a side surface of the at least one module component.

It is possible that the side surface of the power module comprises two or more than two positioning structures which are configured for receiving alignment structures of the alignment tool and are further configured for vertically moving the power module when sliding the alignment tool along a lateral direction.

A vertical direction is understood to mean a direction which is directed perpendicular to a main extension surface of the power module or of the carrier. The carrier can be a cooler or a heat sink. A lateral direction is understood to mean a direction which is parallel to the main extension surface of the power module or of the carrier. The vertical direction and the lateral direction are orthogonal to each other.

Such a power module described here allows an uncomplicated but exact fixation and a secure electrical interconnection of the power module to control electronics.

The positions of the positioning structures on the side surface of the power module allow an exact placement of the power module lateral directions, for instance in horizontal X-direction and longitudinal Y-direction when using an alignment tool with corresponding, for example complementary alignment structures. In virtue of this aspect, a proper alignment of terminals, for example of pin-shaped terminals, of the power module with respect to contact holes of the assembly board, for instance of the control board, can be guaranteed. Hence, it can be avoided that some terminals, for instance some auxiliary terminals, of the power module would be bent or displaced and thus would not fit into the contact holes of the assembly board.

The geometrical form of the at least one positioning structure or of several positioning structures on the side surface of the power module allows moving or guiding the power module along the vertical direction, i.e. along the Z-direction with respect to the alignment tool, in a simplified manner. Thus, a proper interconnection between for instance press-fit pins of the power module and the contact holes of the assembly board can be achieved in a simplified manner. Hence, the positioning structures on the side surface of the power module facilitate the alignment of the power module with respect to the position of the assembly board in lateral directions, wherein the alignment can be accompanied by a controlled movement of the power module along the vertical direction.

According to a further embodiment of the power module, the at least one positioning structure or each of the positioning structures has a sliding surface. The sliding surface is configured that when the alignment tool, for example an alignment structure of the alignment tool, slides over the sliding surface along a lateral direction, a controlled movement of the power module along the vertical direction can be achieved.

According to a further embodiment of the power module, the at least one positioning structure or the positioning structures has/have at least in places a vertically oblique or vertically curved surface. The vertically oblique or vertically curved surface can form the sliding surface. Sliding the alignment tool, for example the alignment structure of the alignment tool, along the vertically oblique or vertically curved surface, the power module can be pressed down or lifted up, resulting in a movement of the power module along the vertical direction, for instance with respect to the alignment tool. In addition or as an alternative, the at least one positioning structure or the positioning structures can have at least in places a lateral plane surface. Sliding the alignment tool, which has at least in places a sliding surface for instance in the form of a vertically oblique or vertically curved surface, along the lateral plane surface of the positioning structure, the power module can also be pressed down or lifted up, resulting in a movement of the power module along the vertical direction.

According to a further embodiment of the power module, the at least one positioning structure comprises a first plane partial surface and a second partial surface, wherein the second partial surface adjoins the first plane partial surface and forms a sliding surface, wherein the sliding surface can be provided by the vertically oblique or vertically curved surface. A plane surface may be understood to mean a flat surface extending basically only along the lateral directions. Such a plane partial surface of the positioning structure may be used to first receive the alignment structure of the alignment tool before the alignment tool is pushed along a lateral direction resulting in a sliding of the alignment tool, for instance of the alignment structure of the alignment tool, on the sliding surface, for example on the vertically oblique or vertically curved partial surface of the positioning structure. The reception of the alignment structure of the alignment tool may be also supported by further oblique, rounded or chamfered portions of sidewalls of an recess for instance next to the opening or oblique, rounded or chamfered portions of a protruding part for instance next to a front portion. These portions provide a tolerance in X-direction to make the insertion easier.

For example, the sliding surface is a smooth surface. The sliding surface can form a ramp. The sliding surface or the ramp can have an angle of gradient or an average angle of gradient between 10° and 70°, for example between 10° and between 10° and 60°, between 10° and 50°, or between 10° and 40°. For instance, the angle of gradient or the average angle of gradient is smaller than or equal 50°, 45°, 40°, 30°, 25° or smaller 20° for having a well-controlled movement of the power module along the vertical direction.

The angle of gradient or the average angle of gradient can be greater than 15°, 20° or 25°.

According to a further embodiment of the power module, the at least one positioning structure or the positioning structures are formed on the side surface of the carrier or on the side surface/s of the module component/s. It is possible that the module component comprises a housing body and/or a baseplate, wherein the side surface of the at least one module component comprising the at least one positioning structure is a side surface of the housing body or of the base plate.

According to a further embodiment of the power module, the at least one positioning structure or the positioning structures is/are formed as a recessed portion or as recessed portions on the side surface of the power module. The recessed portion/s may be formed on the side surface of the carrier and/or on side surface/s of the module component/s. It is possible that the module component comprises a housing body, for instance a molded housing body, and the recessed portion is formed as part of the housing body of the module component.

According to a further embodiment of the power module, the at least one positioning structure or the positioning structures is/are formed as a protruded portion or as protruded portions on the side surface of the power module. The protruded portion/s may be formed on the side surface of the carrier or on side surface/s of the module component/s. It is possible that the protruded portion is formed as part of the housing body or of the baseplate of the module component.

According to a further embodiment of the power module, the at least one positioning structure or the positioning structures has/have a lateral width, a lateral length and a vertical height. The lateral width can be in a range from 1.5 mm to 15 mm, for instance from 1.5 mm to 10 mm or from 1.5 mm to 5 mm, for example about 3 mm. The lateral length can be in a range from 4 mm to 15 mm, for instance from 4 mm to 12 mm or from 6 mm to 10 mm, for example about 8 mm. The vertical height can be in a range from 2 mm to 10 mm, for instance from 2 mm to 8 mm or from 3 mm to 7 mm, for example about 5 mm.

According to a further embodiment, the power module has at least one pin-shaped terminal or several pin-shaped terminals each having a lateral portion and a vertical portion. The lateral portion and the vertical portion can be provided by bending, wherein the vertical portion is bent towards a vertical direction. The at least one positioning structure has the geometrical form configured for sliding the alignment tool and for vertically moving the power module when sliding the alignment tool. For example, the geometrical form comprises a sliding surface forming a ramp. The moving of the power module along the vertical direction, for instance with respect to the alignment tool and/or the assembly board for example for the insertion of the pin-shape terminal/s into contact hole/s of the assembly board, results in the moving of the at least one pin-shaped terminal or of the several pin-shaped terminals along the vertical direction. For example, the pin-shaped terminals are parts of the module component or of the module components arranged on the carrier. The pin-shaped terminals can have press-fit connectors on their end portions.

According to an embodiment of an alignment tool, it has a side surface comprising alignment structures. At least one of the alignment structures is configured for docking at a power module, for instance at one positioning structure of the power module. The alignment tool is configured that when the alignment structure slides on a surface of the power module, for instance on a surface of the positioning structure of the power module, along a lateral direction, the lateral movement of the alignment tool is accompanied by a controlled movement of the power module along a vertical direction for instance with respect to the alignment tool. For example, when the alignment structure slides on a sliding surface of the power module along the lateral direction, the alignment tool automatically moves the power module along the vertical direction in a controlled manner.

The alignment structure/s of the alignment tool can have a geometrical form which is complementary to the geometrical form of the positioning structure/s of the power module. Are the geometrical form of the alignment structure and the geometrical form of the positioning structure mutually complementary, the alignment structure can be inserted into the positioning structure or vice versa. For example, the alignment structure is a recessed portion on the side surface of the alignment tool and the positioning structure is a protruded portion on the side surface of the power module. It is also possible that the alignment structure is a protruded portion on the side surface of the alignment tool and the positioning structure is a recessed portion on the side surface of the power module. The protruded portion and the recessed portion can have different geometries and/or sizes.

Since the geometrical forms and the sizes of the alignment structure and of the positioning structure may be interchanged, features described in this disclosure with regard to the geometrical forms and the sizes of the positioning structure can also be applied for the alignment structure, and vice versa. For example, the alignment structure can have in places a sliding surface, for instance in the form of a vertically oblique or vertically curved surface. The alignment structure can be formed by a recessed portion or by a protruded portion. Moreover, the alignment structure has a lateral width, a lateral length and a vertical height, wherein the lateral width can be in a range from 1.5 mm to 15 mm, for instance from 1.5 mm to 10 mm or from 1.5 mm to 5 mm, for example about 3 mm, the lateral length can be in a range from 4 mm to 15 mm, for instance from 4 mm to 12 mm or from 6 mm to 10 mm, for example about 8 mm, and the vertical height can be in a range from 2 mm to 10 mm, for instance from 2 mm to 8 mm or from 3 mm to 7 mm, for example about 5 mm.

According to a further embodiment, the alignment tool comprises at least one vertical slot for receiving and fixing a lateral position of at least one pin-shaped terminal of the power module. Moreover, the vertical slot can provide mechanical support when moving the power module along the vertical direction, for example in case of inserting press-fit terminals into contact holes. The alignment tool can comprise a plurality of such vertical slots on its side surface. The vertical slot may be a V-shaped recess. In addition or as an alternative, the alignment tool can comprise one U-shaped recess or a plurality of U-shaped recesses for receiving and fixing lateral positions of one main terminal or of a plurality of main terminals of the power module. The U-shaped recess can have a larger size, for instance a larger width and/or a larger length and/or a greater height than the vertical slot which is formed for instance as a V-shaped recess. The pin-shaped terminals of the module may be auxiliary or control terminals. Such pin-shaped terminal may have a lateral portion and a vertical portion and/or have press-fit connectors on their end portions. The lateral portion and the vertical portion can be provided by bending, wherein the vertical portion is bent towards the vertical direction.

According to an embodiment of a method for aligning a power module with respect to an assembly board, an alignment tool is used. The method comprises the step of positioning a side surface of the power module at a side surface of the alignment tool, wherein the side surface of the alignment tool comprises alignment structures. At least one of the alignment structures is configured for docking at least one positioning structure on the side surface of the power module. The method further comprises the step of inserting the at least one positioning structure into the at least one alignment structure or of inserting the at least one alignment structure into the at least one positioning structure for aligning the power module with respect to the assembly board, resulting in a sliding of the alignment tool along a lateral direction with respect to the power module, wherein the sliding of the alignment tool along the lateral direction is accompanied by a controlled movement of the power module along a vertical direction with respect to the assembly board. After the power module is aligned to the assembly board, the alignment tool is released from the power module.

The power module is for instance any power module described in this disclosure. The alignment tool is for instance any alignment tool described in this disclosure. The alignment structure and the positioning structure can have mutually complementary geometrical forms. It is possible that the alignment tool comprises 2, 3, 4 or more alignment structures which can be inserted into 2, 3, 4 or more complementary positioning structures of the power module, or vice versa.

In such a method, a controlled movement of the alignment tool and/or of the power module can be achieved not only in a lateral direction but also in a vertical direction. For example, by pushing or releasing the alignment tool along the lateral direction, an additional movement of the power module in the vertical direction is automatically provided, for instance with respect to the alignment tool and/or with respect to the assembly board. For example, depending on the sliding direction or depending on the geometrical form of the alignment structure and/or of the positioning structure, the power module can be pushed down or lifted up along the vertical direction.

According to a further embodiment of the method, the power module is interconnected to an assembly board. The controlled movement of the power module is carried out along the vertical direction, for instance towards the assembly board or away from the assembly board. It is possible that several power modules are interconnected to the assembly board. The assembly board can be a control board or a printed circuit board. The assembly board can be arranged on an upper side or on a lower side of the power module/s.

Thus, if the power module is to be mechanically and/or electrically connected to an assembly board, the position of the power module and the positions of the terminals of the power module can be adjusted in a highly exact manner relative to the position of the assembly board and to the positions of the electrical contacts points, for instance to the positions of the contact holes of the assembly board, respectively. The additional freedom for vertically moving the power module in a controlled manner significantly simplifies the process of mechanically fixing and electrically connecting the module to the assembly board. This facilitates not only an alignment in lateral direction, but also in vertical direction.

According to a further embodiment of the method, the power module has at least one pin-shaped terminal which has a lateral portion and a vertical portion. The lateral portion and the vertical portion can be provided by bending, wherein the vertical portion is bent towards the vertical direction, for example towards the assembly board. An end section of the terminal can be directed vertically towards a contact hole of the assembly board.

The assembly board comprises at least one contact hole for receiving the pin-shaped terminal. The controlled movement of the power module can be configured for adjusting the position of the pin-shaped terminal relative to the position of the contact hole and for inserting the pin-shaped terminal into the contact hole. It is possible that the power module or the module component has a plurality of such pin-shaped terminals. The assembly board can comprise a plurality of contact holes for receiving the pin-shaped terminals. The pin-shaped terminals can be press-fit pins. For example, the pin-shaped terminals have press-fit connectors on their end portions.

According to a further embodiment of the method or of the alignment tool, the side surface of the alignment tool comprises at least one vertical slot or several vertical slots for receiving and fixing a lateral position of the at least one pin-shaped terminal or for receiving and fixing lateral positions of several pin-shaped terminals of the power module. The slot/s can have a bottom surface for mechanically supporting the pin-shaped terminals formed as press-fit terminals. Thus, the slot/s can provide mechanical support when moving the power module in the vertical direction for instance in case of inserting press-fit terminal/s into contact hole/s. In addition or as an alternative, the press-fit terminal/s may comprise cross-bars for providing mechanical support when inserting the press-fit terminal/s into contact hole/s. Thus, the mechanical support is provided by the alignment tool when there are mechanical supports for the crossbars. The vertical slots may be formed as V-shaped recesses for positioning and aligning the pin-shaped terminals in lateral directions.

According to a further embodiment of the method, the at least one positioning structure and the at least one alignment structure have mutually complementary geometrical forms. For instance, one of the at least one positioning structure and the at least one alignment structure is formed as a recessed portion, wherein the other one of the at least one positioning structure and the at least one alignment structure is formed as a protruded portion. Forming the positioning structure and the alignment structure in this way, the alignment tool and the power module can be inserted into each other in places. Thus, the relative position between the power module and the alignment tool can be fixed in one lateral direction perpendicular to the inserting direction. The alignment according to inserting direction can be provided by ends portions of the recessed parts or by touching the sidewalls of power module and alignment tool. Here, the alignment tool cannot be pushed further along the inserting direction. The alignment tool and the power module can comprise at least two, three, four or more pairs of such complementary positioning structures and alignment structures.

According to a further embodiment of the method, one of the at least one positioning structure and the at least one alignment structure has at least in places a vertically oblique or vertically curved surface. The vertically oblique or vertically curved surface is used for sliding the alignment tool along the lateral direction resulting in the controlled movement of the power module along the vertical direction, for instance with respect to the alignment tool. Thus, the vertically oblique or vertically curved surface can be considered as sliding surface. It is possible that only one or both of the positioning structure and the alignment structure has/have at least in places a vertically oblique or vertically curved surface. It is possible that a protruded portion of the positioning structure or of the alignment structure may have an oblique, rounded or chamfered front surface which is getting in contact with corresponding structure instead of sharp edges, for providing a better sliding.

The present disclosure comprises several aspects of a power module, an alignment tool and of a method for positioning and aligning the power module on the basis of their embodiments and examples. Every feature described with respect to one of the aspects is also disclosed herein with respect to the other aspect, even if the respective feature is not explicitly mentioned in the context of the specific aspect. For example, the method described in this disclosure is directed to a method for positioning and aligning the power module using the alignment tool described here. Thus, features and advantages described in connection with the power module or the alignment tool can be used for the method, and vice versa.

While the disclosure is amenable to various modifications and alternative forms, specifics thereof are shown by way of example in the figures and will be described in detail. It should be understood, however, that the intention is not to limit the disclosure to the particular described embodiments and examples. On the contrary, the intention is to cover all modifications, equivalents, and alternatives falling within the scope of the disclosure defined by the appended claims.

The accompanying figures are included to provide a further understanding. In the figures, elements of the same structure and/or functionality may be assigned to the same reference signs. It is to be understood that the examples shown in the figures are illustrative representations and are not necessarily true to scale.

Figure 1:
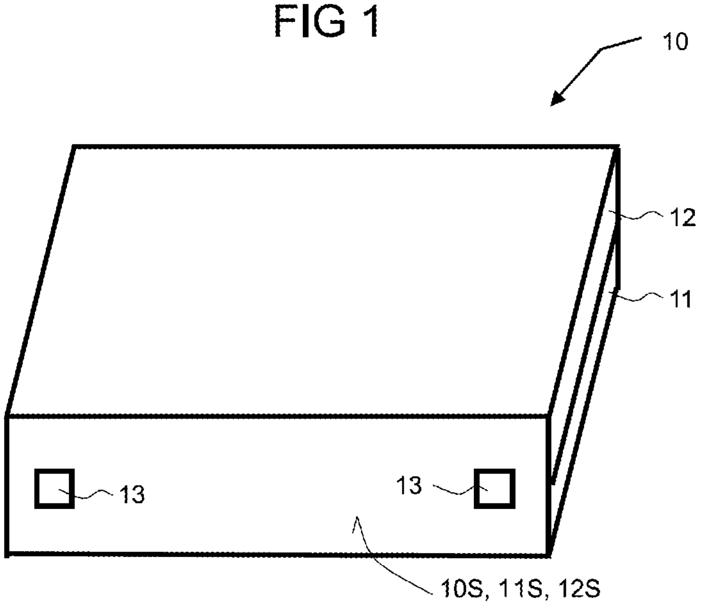
FIG. 1 shows a general concept of a power module according to an example.

FIG. 1 shows a perspective view of a power module 10 according to an embodiment. The power module 10 comprises a carrier 11 and at least one module component 12 arranged on the carrier 11. The carrier 11 may be cooler or a heat sink but is not restricted thereto. The module component 12 can comprise one or many of: electronic chip, semiconductor chip, embedded semiconductor chip, substrate with one or several chips arranged thereon, diode, component comprising Si and/or SiC and/or gallium nitride, circuit devices, discrete devices like resistor, capacitor, inductive component and/or transistor like IGBT, HEMT, MOSFET etc., but is not limited thereto.

The power module 10 has a side surface 10S which can be formed partially by a side surface 11S of the carrier 11 and partially by a side surface 12S of the at least one module component 12. The side surface 10S of the power module 10 comprises positioning structures 13, wherein at least one of the positioning structures 13 has a geometrical form which is configured for receiving an alignment tool 20 and is further configured for vertically moving the power module 10 when sliding the alignment tool 20 for example on a sliding surface of the positioning structure 13.

Figure 2:
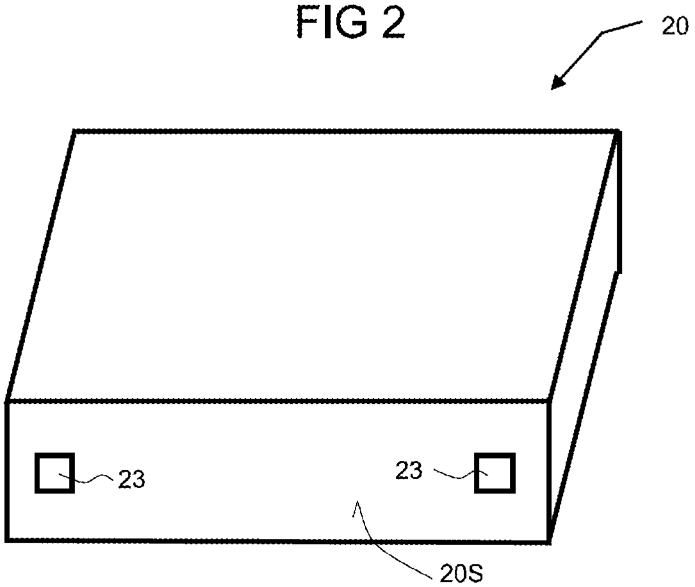
FIG. 2 shows a general concept of an alignment tool according to an example.

FIG. 2 shows a perspective view of an alignment tool 20 according to an exemplary embodiment. The alignment tool 20 has a side surface 20S comprising alignment structures 23. At least one of the alignment structures 23 is configured for docking at one positioning structure 13 of the power module 10. For example, the alignment tool 20 is configured that when the alignment structure 23 slides on a surface, for instance on the sliding surface of the positioning structure 13 along a lateral direction, the alignment tool 20 moves the power module 10 along a vertical direction due to the geometrical forms of the positioning structure 13 and its corresponding alignment structure 23, resulting in for instance pressing down the power module 10 or lifting up the power module 10. For example, the process of sliding the alignment tool 20 along a lateral direction automatically results in moving the power module 10 along the vertical direction.

The positioning structure 13 of the power module 10 shown in FIG. 1 can provide a counterpart to the corresponding alignment structure 23 of the alignment tool 20 shown in FIG. 2. For example, the positioning structure 13 is a protruded portion and the corresponding alignment structure 23 is a recessed portion, or vice versa.

Figure 3:
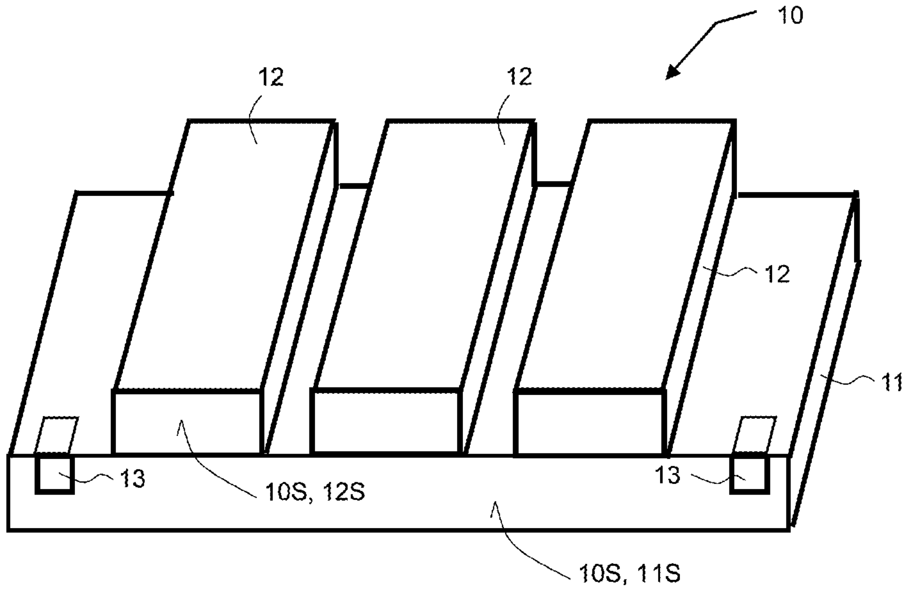
FIGS. 3, 4, 5 and 6 show some concrete realizations of a power module according to some specific examples.

FIG. 3 shows a perspective view of the power module 10 according to another embodiment. Here, the positioning structures 13 are formed on the side surface 11S of the carrier 11. For example, the positioning structures 13 are formed at an upper edge of the side surface 11S of the carrier 11. The upper edge of the side surface 11S can be seen as a boundary line between the side surface 11S and a top surface of the carrier 11. In this case, the positioning structures 13 are also partially formed on the top surface of the carrier 11. As shown in FIG. 3, the top surface of the carrier 11 is a surface on which the module component 12 or a plurality of module components 12 is/are arranged.

Figure 4:
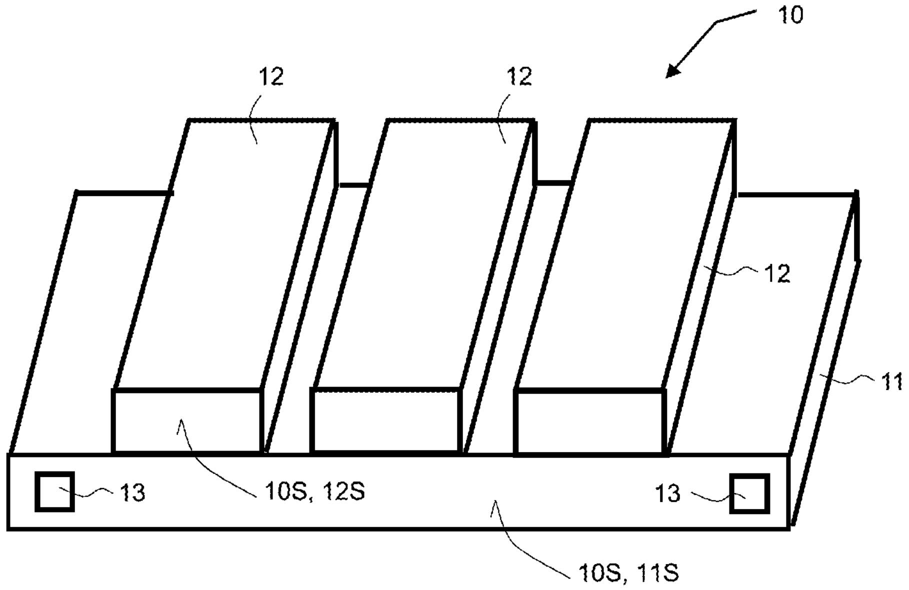

FIG. 4 shows a perspective view of the power module 10 according to another embodiment. Here, the positioning structures 13 are formed on the side surface 11S of the carrier 11 and are spaced apart from any edges of the side surface 11S.

Figure 5:
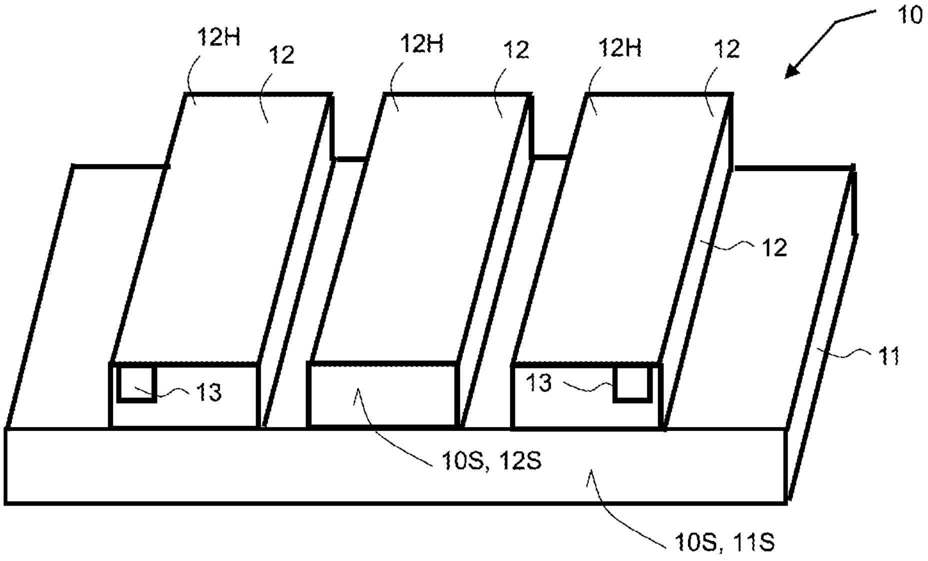

FIG. 5 shows a perspective view of the power module 10 according to another embodiment. Here, the positioning structures 13 are formed on side surface/s 12S of the module component/s 12. According to FIG. 5, the positioning structures 13 can be formed at upper edges of the side surfaces 12S of the module component/s 12.

Figure 6:
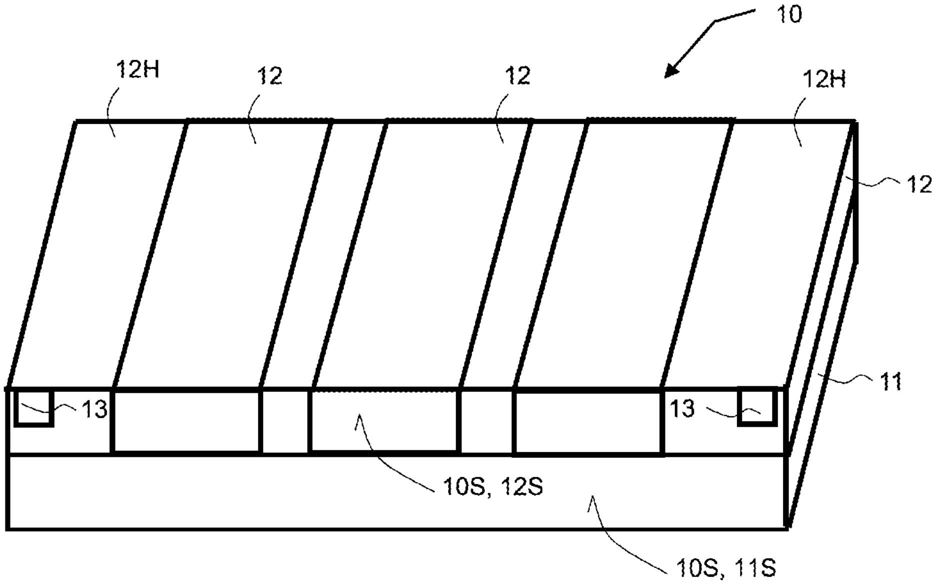

The module component 12 can comprise a housing body 12H, for instance a molded housing body, and the side surface 12S of the module component 12 comprising at least one positioning structure 13 can be a side surface of the housing body 12H. It is possible that each of the module components 12 has a housing body 12H. Alternatively, it is also possible that the module components 12 arranged on the carrier 11 share a common housing body 12H. This is shown for instance in FIG. 6.

Similarly to the positioning structure/s 13, the alignment structure/s 23 as shown in FIG. 2 can be formed on the side surface 20S of the alignment tool 20 at positions which are spaced apart from any edges of the side surface 20S. Alternatively, it is also possible that the alignment structure/s 23 are formed at an upper edge and/or at lateral edges of the side surface 20S of the alignment tool 20.

FIGS. 7A, 7B, 7C, 7D, 8A, 8B, 8C and 8D show different exemplary geometrical forms of the positioning structure 13 or of the alignment structure 23. Since the geometrical forms and the sizes of the alignment structure 23 and of the complementary positioning structure 13 may be interchanged, the geometrical forms shown in FIGS. 7A to 8D may be applied for both the positioning structure 13 and the alignment structure 23. Moreover, depending on whether the power module 10 shall be pushed down or lifted up along a vertical Z-direction when sliding the alignment tool 20 along a lateral Y-direction, the exemplary geometrical forms of the positioning structure 13 or of the alignment structure 23 may be formed to be rotated around one axis along the lateral Y-direction by an angle of 180° even it is not shown explicitly in the FIGS. 7A to 8D.

Figure 7A:
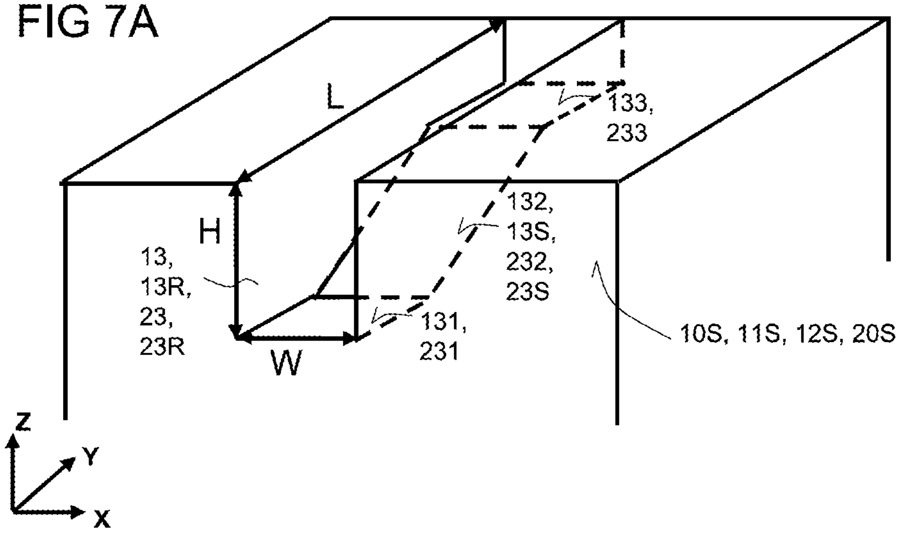
FIGS. 7A, 7B, 7C, 7D, 8A, 8B, 8C and 8D show different layouts of a positioning structure according to different examples of the power module or different layouts of an alignment structure according to different examples of the alignment tool.
Figure 7B:
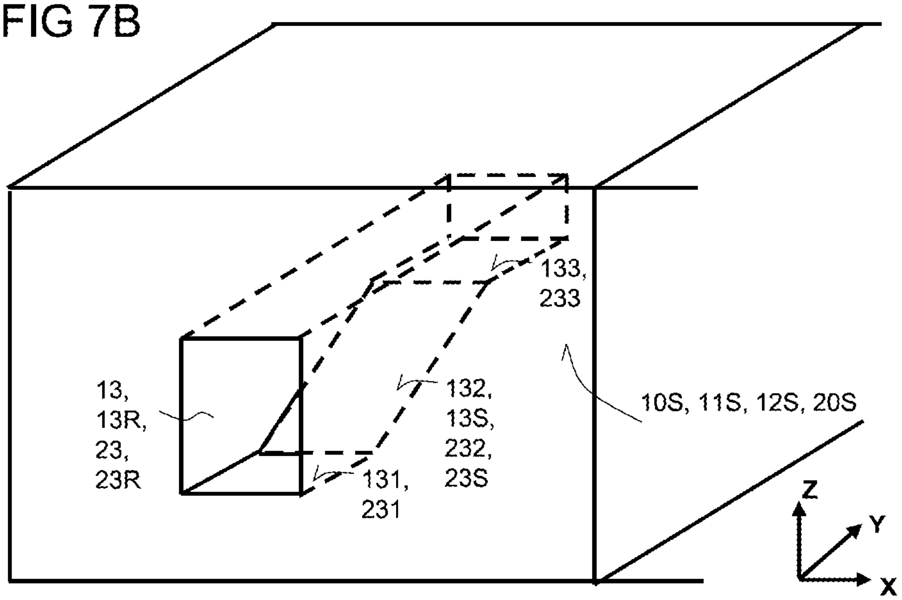
Figure 7C:
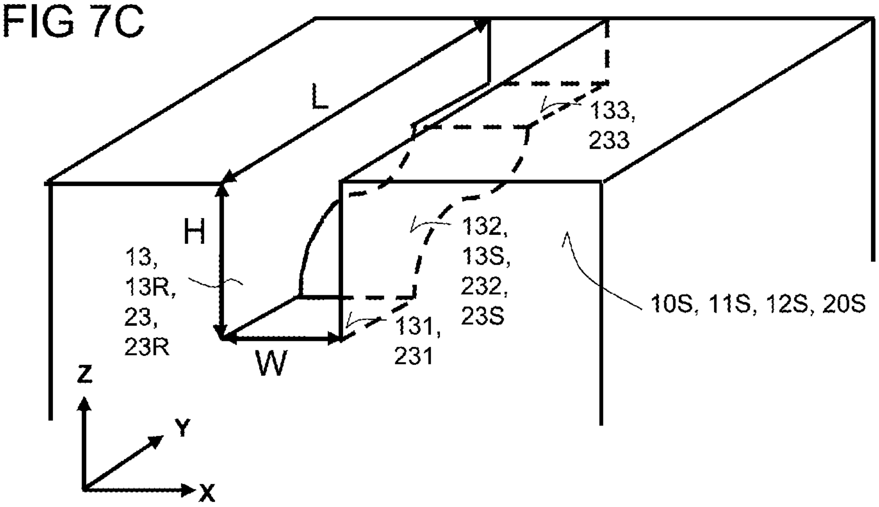
Figure 8A:
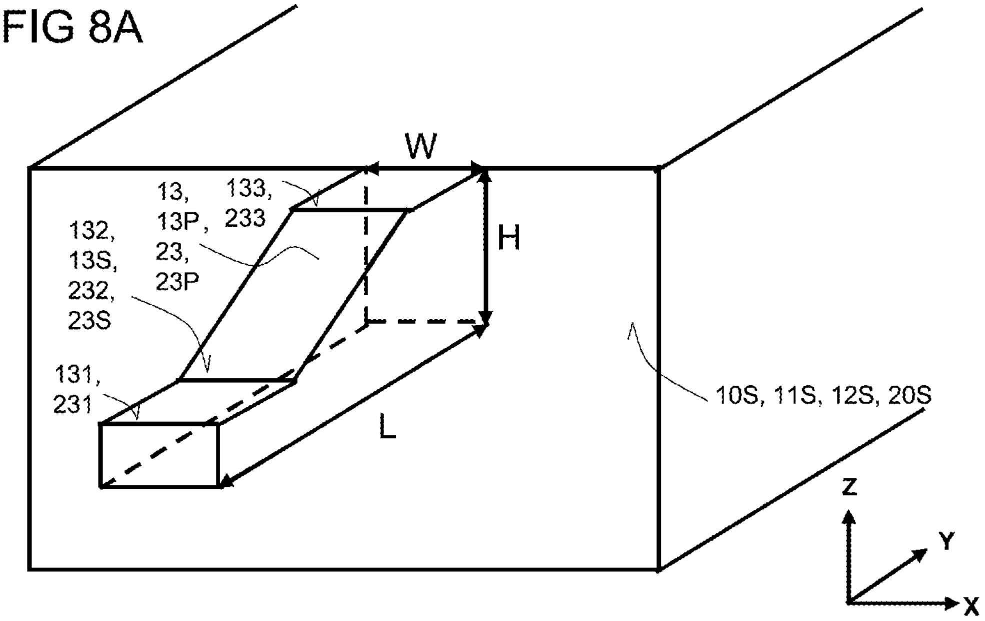
Figure 8B:
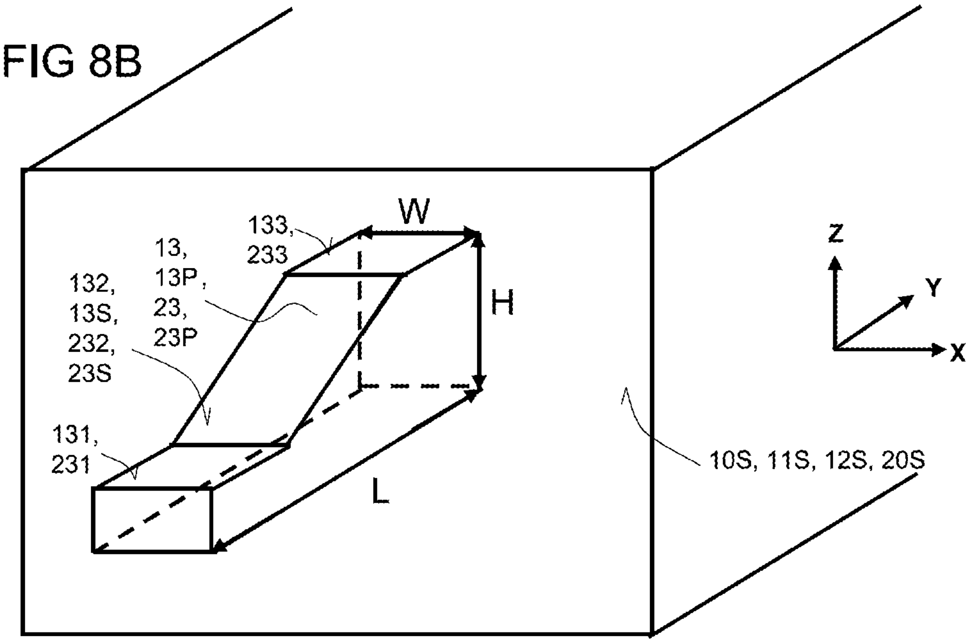
Figure 8C:
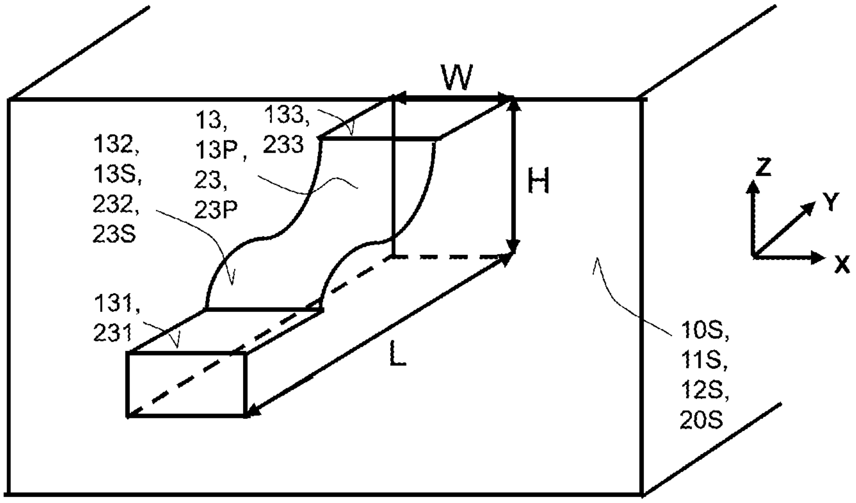
Figure 8D:
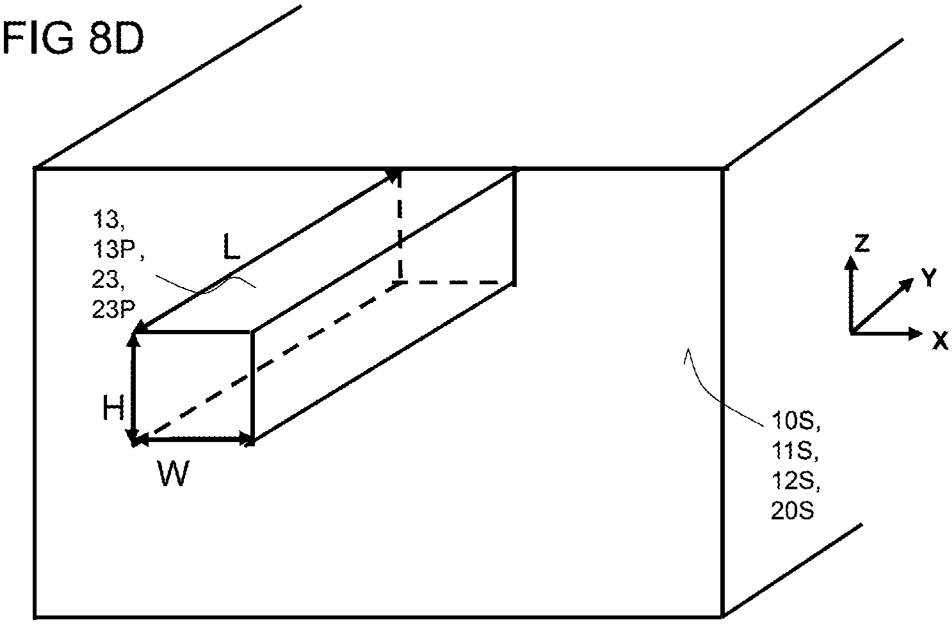

For example, laterally sliding an alignment tool 20 having an alignment structure 23 having the form of a protruded portion 23P, for example having a cuboid-like form, as shown for instance in FIG. 8D along the Y-direction on a surface of a positioning structure 13 shown in any one of FIGS. 7A, 7B, 7C, 8A, 8B and 8C, the power module 10 will be pushed down along the Z-direction resulting in a controlled downward movement—with respect to the alignment tool 20—of the power module 10 along the vertical Z-direction Z. If the positioning structure 13 shown in FIG. 7A, 7B, 7C, 8A, 8B or 8C, however, is rotated around the lateral Y-direction by an angle of 180°, sliding the alignment tool 20 shown in FIG. 8D along the Y-direction will result in a controlled movement of the power module 10 along the upward vertical Z-direction with respect to the alignment tool 20. In this case, the power module 10 will be lifted up.

In this disclosure, any combination of the positioning structure 13 and of the alignment structure 23 shown in FIGS. 7A, 7B, 7C, 7D, 8A, 8B, 8C and 8D can be used for carrying out a controlled upward or downward movement of the power module 10 along the vertical direction Z, when the positioning structure 13 is formed as a recessed portion and the alignment structure 23 is formed as a protruded portion, or vice versa, and—if necessary—the positioning structure 13 or the alignment structure 23 can be rotated around one axis along the lateral Y-direction by an angle of 180° even it is not shown explicitly in the FIGS. 7A to 8D. The recessed portion or the protruded portion may have at least oblique portions, for instance at the tip or at the inlet respectively, of sidewalls to improve insertion of protruded portions into the recessed portions. These portions provide a tolerance in X-direction to make the insertion easier.

FIG. 7A shows the positioning structure 13 or the alignment structure 23 being formed as a recessed portion 13R or 23R at an edge, here at an upper edge, of the side surface 10S or The recessed portion 13R or 23R has a lateral width W along a first lateral X-direction being for example a horizontal direction, a lateral length L along a second lateral Y-direction being for example a longitudinal direction and a vertical height H along the vertical Z-direction. The lateral width W can be a lateral width 13W of the positioning structure 13 or a lateral width 23W of the alignment structure 23. The lateral length L can be a lateral length 13L of the positioning structure 13 or a lateral length 23L of the alignment structure 23. The vertical height H can be a vertical height 13H of the positioning structure 13 or a vertical height 23H of the alignment structure 23.

The recessed portion 13R or 23R comprises a surface, here a bottom surface different from vertical walls of the recessed portion 13R or 23R, wherein the surface comprises a first partial surface, a second partial surface adjoining the first partial surface and a third partial surface adjoining the second partial surface. The second partial surface or the complete bottom surface can form a sliding surface. In case of the power module 10, the first partial surface, the second partial surface and the third partial surface of the recessed portion 13R can be a first partial surface 131, a second partial surface 132 and a third partial surface 133 of the positioning structure 13, respectively. In case of the alignment tool 20, the first partial surface, the second partial surface and the third partial surface of the recessed portion 23R can be a first partial surface 231, a second partial surface 232 and a third partial surface 233 of the alignment structure 23, respectively.

Apart from FIG. 7A, it is possible that the recessed portion 13R or 23R comprises only the second partial surface, only the first and the second partial surfaces or only the second and the third partial surfaces.

As shown in FIG. 7A, the first partial surface and/or the third partial surface and/is a laterally plane partial surface/s. The second partial surface is a vertically oblique surface. Thus, as shown in FIG. 7A, the positioning structure 13 or the alignment structure 23 has in places a vertically oblique surface 13S or 23S which is formed by the second partial surface 132 or 232. Sliding the alignment tool on the vertically oblique surface along the lateral Y-direction will result in a controlled movement of the power module 10 along the vertical Z-direction. The vertically oblique surface 13S or 23S can be considered as local oblique ramp of the positioning structure 13 or of the alignment structure 23. As shown in FIG. 7A, the X-extension of the slot-like structure provides an alignment in X-direction, and the end wall of the slot-like structure provides an alignment in Y-direction. Alternatively, the sidewalls of power module and alignment tool 20 get in touch and stop the insertion.

The positioning structure 13 or the alignment structure 23 shown in FIG. 7B is basically identical to the positioning structure 13 or the alignment structure 23 shown in FIG. 7A, except that the position of the positioning structure 13 or the alignment structure 23 in FIG. 7B is spaced apart from any edges of the side surface 11S, 12S or 20S.

Furthermore, it is possible that recessed portion 13R or 23R shown in FIG. 7B or in any other Figures of this disclosure is rotated around one axis along the lateral Y-direction by an angle of 180°.

The positioning structure 13 or the alignment structure 23 shown in FIG. 7C is basically identical to the positioning structure 13 or the alignment structure 23 shown in FIG. 7A, except that the positioning structure 13 or the alignment structure 23 has at least in places a vertically curved surface 13S or 23S which is formed by the second partial surface 132 or 232.

The vertically curved surface 13S or 23S can be considered as local oblique ramp of the positioning structure 13 or the alignment structure 23. In deviation from FIG. 7C and similarly to the example disclosed in FIG. 7B, it is possible that the positioning structure 13 or the alignment structure 23 is spaced apart from any edges of the side surface 11S, 12S or 20S.

Figure 7D:
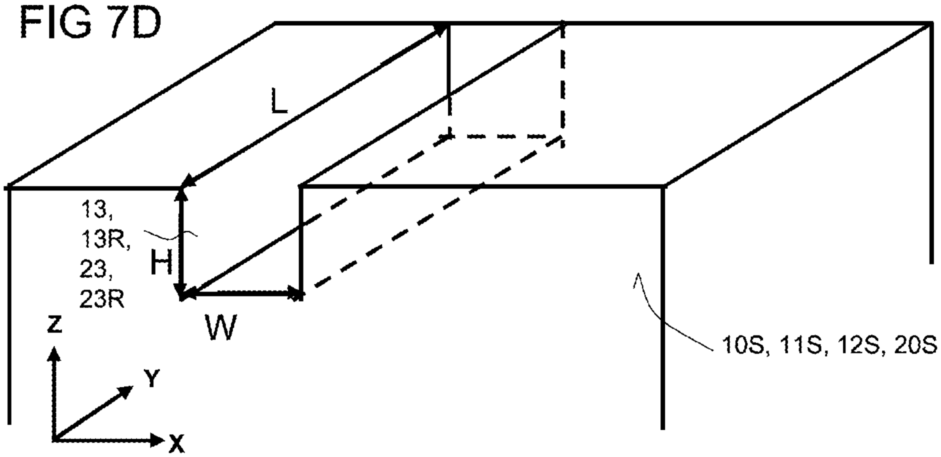

The positioning structure 13 or the alignment structure 23 shown in FIG. 7D is basically identical to the positioning structure 13 or the alignment structure 23 shown in FIG. 7A, except that the recessed portion 13R or 23R, i.e. the positioning structure 13 or the alignment structure 23, has a laterally plane bottom surface. In this case, the complete bottom surface of the corresponding alignment structure 23 or of the corresponding positioning structure 13 may form a sliding surface which is vertically oblique or vertically curved. In deviation from FIG. 7D and similarly to the example shown in FIG. 7B, it is possible that the positioning structure 13 or the alignment structure 23 shown in FIG. 7D is spaced apart from any edges of the side surface 11S, 12S or 20S. For achieving a controlled movement of the power module 10 along the vertical Z-direction, the complementary alignment structure 23 or the complementary positioning structure 13 may be formed as a protruded portion 13P or 23P which has for instance at least in places a vertically oblique or vertically curved surface 13S or 23S.

The positioning structure 13 or the alignment structure 23 shown in FIG. 8A is basically the positioning structure 13 or the alignment structure 23 shown in FIG. 7A, except that the positioning structure 13 or the alignment structure 23 is formed as a protruded portion 13P or 23P on the side surface 11S, 12S or 20S. The protruded portion and the recessed portion can have different geometries and/or sizes.

In this case, a top surface of the protruded portion 13P or 23P comprises a first partial surface 131 or 231, a second partial surface 132 or 232 adjoining the first partial surface 131 or 231 and a third partial surface 133 or 233 adjoining the second partial surface 132 or 232, wherein the first partial surface 131 or 231 and/or the third partial surface 133 or 233 are laterally plane and the second partial surface 132 or 232 is vertically oblique. A lower surface of the protruded portion 13P or 23P can be a laterally plane surface.

It is, however, possible that the protruded portion 13P or 23P shown in FIG. 8A or in any other Figures of this disclosure is rotated around one axis along the lateral direction Y by an angle of 180°. In this case, a lower surface of the protruded portion 13P or 23P comprises the first, second and third partial surfaces.

The positioning structure 13 or the alignment structure 23 shown in FIG. 8B is basically identical to the positioning structure 13 or the alignment structure 23 shown in FIG. 8A, except that the position of the positioning structure 13 or of the alignment structure 23 in FIG. 8B is spaced apart from any edges of the side surface 11S, 12S or 20S.

The positioning structure 13 or the alignment structure 23 shown in FIG. 8C is basically identical to the positioning structure 13 or the alignment structure 23 shown in FIG. 8A, except that the positioning structure 13 or the alignment structure 23 has at least in places a vertically curved surface 13S or 23S which is formed by the second partial surface 132 or 232. In deviation from FIG. 8C and similarly to the example disclosed in FIG. 8B, it is possible that the position of the positioning structure 13 or of the alignment structure 23 is spaced apart from any edges of the side surface 11S, 12S or 20S.

The positioning structure 13 or the alignment structure 23 shown in FIG. 8D is basically identical to the positioning structure 13 or the alignment structure 23 shown in FIG. 8A, except that the protruded portion 13P or 23P, i.e. the positioning structure 13 or the alignment structure 23, has a laterally plane top surface. In deviation from FIG. 8D and similarly to the example disclosed in FIG. 8B, it is possible that the positioning structure 13 or the alignment structure 23 shown in FIG. 8D is spaced apart from any edges of the side surface 11S, 12S or 20S. Also in this case, the corresponding or complementary alignment/positioning structure 23/13 shall have an at least partly oblique or curved bottom surface.

Figure 9:
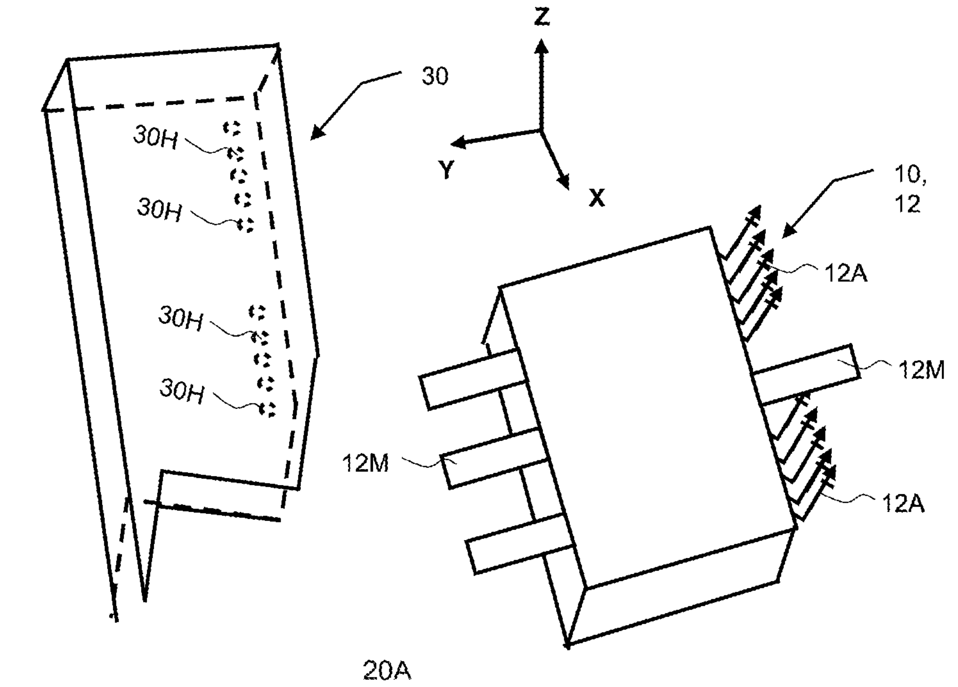
FIG. 9 shows an example of a power module or of a module component of the power module which is to be interconnected to an assembly board.

FIG. 9 shows an example of a power module 10 or of a module component 12 of the power module 10 which is to be interconnected to an assembly board 30, wherein the power module 10 has at least one pin-shaped terminal 12A or several pin-shaped terminals 12A which is/are bent towards the vertical Z-direction. The pin-shaped terminals 12A can be auxiliary or control terminals of the power module 10 or of the module component/s 12. The power module 10 or the module component 12 can further comprise at least one main terminal 12M or a plurality of main terminals 12M. The assembly board comprises at least one contact hole 30H or a plurality of contact holes 30H for receiving the pin-shaped terminals 12A. The pin-shaped terminals 12A may have a press-fit section to be inserted which provides the need also of support because of considerable mechanical forces. The assembly board 30 can be a control board realized as a printed circuit board.

As schematically shown in FIG. 9, the assembly board 30 may be arranged at a vertical position on top of the power module 10. Using an alignment tool 20, which is shown for instance in FIG. 10A, the power module 10 can be positioned and aligned with respect to the position of the assembly board 30 in lateral X-direction and Y-direction. Additionally sliding the alignment tool 20 along the lateral Y-direction will automatically result in moving the power module 10 along the vertical Z-direction with respect to the alignment tool 20 in a well-controlled manner. Thus, the controlled movement of the power module 10 can be configured for adjusting the position of the pin-shaped terminal/s 12A relative to the position/s of the contact hole/s 30H of the assembly board 30 in X- and Y-direction and furthermore for inserting the pin-shaped terminal/s 12A into the contact hole/s 30H in an efficient and secure manner. Here, the alignment in X- and Y-directions as well as the insertion of pin-shaped terminal/s 12A can be carried out in one single step.

Figure 10A:
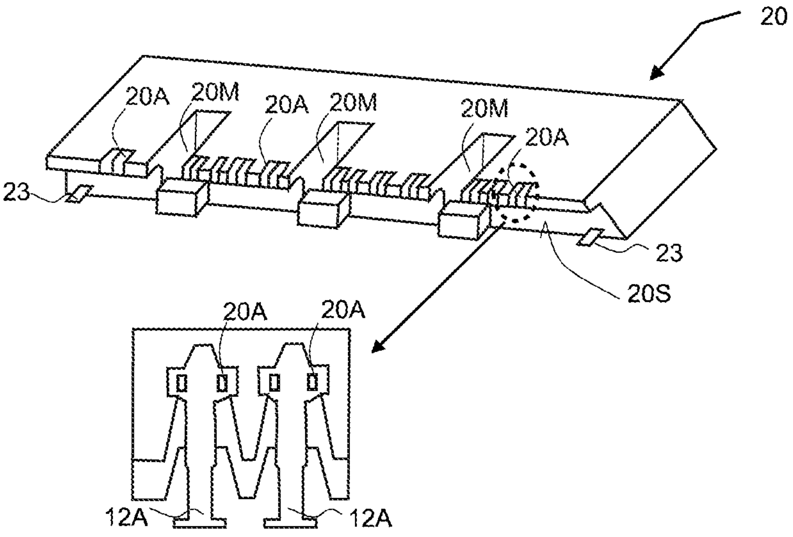
FIG. 10A shows one exemplary embodiment of an alignment tool.

As shown in FIG. 10A, the alignment tool 20 comprises at least two alignment structures 23 on its side surface 20S. The alignment structures 23 are formed as protruded portions. Furthermore, the side surface 20S can comprise vertical slots for receiving the pin-shaped terminal 12A of the power module 10. For instance, the vertical slots 20A are also configured to fix the lateral positions of the pin-shaped terminal 12A. Moreover, the vertical slots 20A also provide mechanical support when moving in Z-direction for instance in case of insertion of pin-shaped terminal 12A formed as press-fit contacts.

As shown in FIG. 10A, the vertical slots 20A may be formed as V-shaped recesses for positioning and aligning the pin-shaped terminals 12A in lateral directions. This can be provided by the sidewalls and end walls of the vertical slots 20A. It is possible that bottom surfaces of the vertical slots 20A and/or reception portions 20R of the vertical slots for receiving cross-bars 12B of the pin-shaped terminals 12A are used for providing a proper alignment and/or for positioning of the terminals 12A in the vertical Z-direction and/or for mechanical support when the pin-shaped terminals 12A are inserted into the contact holes 30H.

Figure 10B:
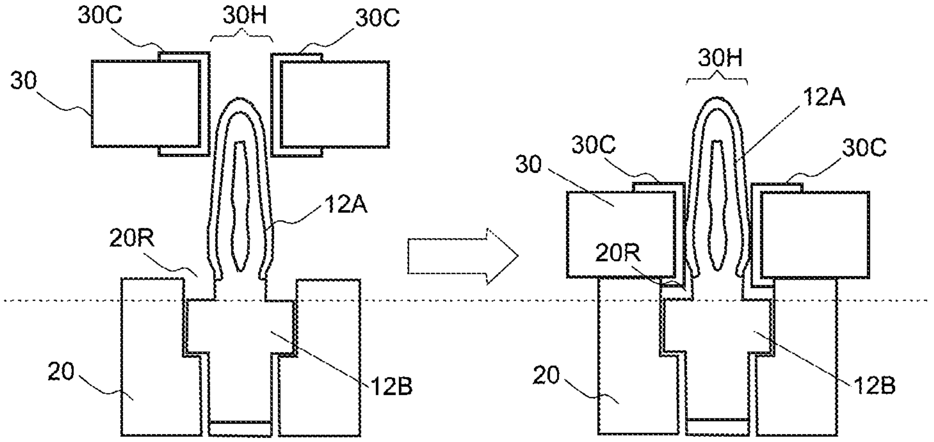
FIG. 10B shows cross-sectional views of a reception portion of the alignment tool when receiving a press-fit terminal.

In the case of the availability of the reception portions 20R for the cross-bars 12B of the pin-shaped terminals 12A which are for example press-fit terminals, the reception portions may also support the alignment of the pin-shaped terminals 12A in a lateral direction, for instance in the lateral Y-direction. The reception portions 20R can also provide a mechanical support on their bottom surfaces and thus also provide an alignment of pin-shaped terminals 12A in Z-direction. The mechanical support by the bottom surface is similar to the mechanical support shown in FIG. 10B when a press-fit terminal 12A is inserted or pressed into a contact hole 30H of an assembly board 30. As shown in FIG. 10B, inside and partly outside the contact hole 30H, the assembly board 30 may be provided with a contact layer 30C for having an electrical contact with the press-fit terminal 12A. The contact layer 30C may be a metallization.

In addition or as an alternative to the cross-bars 12B, the slot/s can have bottom surface/s for mechanically supporting the press-fit terminals, so that the slot/s can provide mechanical support when moving the power module in the vertical direction for instance in case of inserting press-fit terminal/s into contact hole/s.

The side surface 20S of the alignment tool 20 can further comprise recesses 20M for receiving the main terminals 12M of the power module 10. The recesses 20M may be U-shaped recesses. The U-shaped recess can have a larger size, for instance a larger width and/or a larger length and/or a greater height than the vertical slot 20A which is formed for instance as a V-shaped recess.

Figure 11:
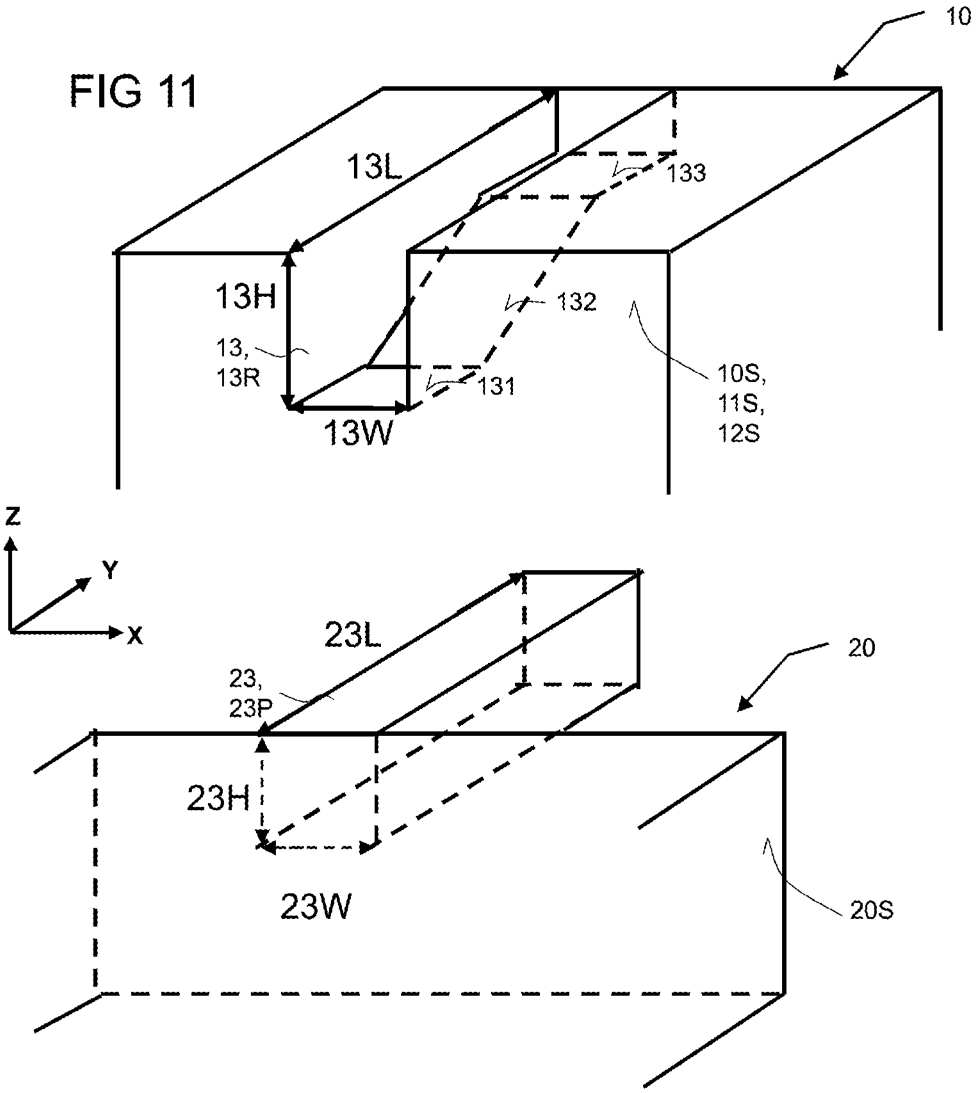
FIGS. 11, 12A and 12B show some method steps according to an example of a method for positioning and aligning the power module.

FIG. 11 illustrates the use of a positioning structure 13 of the power module 10 and its complementary alignment structure 23 of the alignment tool 20. The positioning structure 13 in FIG. 11 being a recessed portion 13R is also shown in FIG. 7A. The alignment structure 23 in FIG. 11 being a protruded portion 23P is also shown in FIG. 8D.

It is possible that the recessed portion 13R or the protruded portion 23P may have at least oblique, rounded or chamfered portions, for instance at the tip or at the inlet respectively, of sidewalls to improve insertion of protruded portions 23P into the recessed portions 13R.

Here, the first laterally plane partial surface 131 of the positioning structure 13 is configured to receive the alignment structure 23 of the alignment tool 20. Moving the alignment tool 20 along the lateral X-direction may fine-tune the lateral position of the power module 10 without changing the vertical position of the power module 10. Laterally sliding the alignment structure 23 along the lateral Y-direction on the second vertically oblique partial surface 132 of the positioning structure 13, however, will result in pushing down the power module 10 along the vertical Z-direction with respect to the alignment tool 20. Thus, the sliding of the alignment tool 20 along the lateral Y-direction is accompanied by a controlled movement of the power module 10 along the vertical Z-direction. The third laterally plane partial surface 133 of the positioning structure 13 can act as a buffer area for the alignment structure 23 and can be used for preventing possible misalignment of the power module 10 along the Y-direction.

In connection with FIG. 11, the positioning structure 13 and the alignment structure 23 have mutually complementary geometrical forms, wherein the positioning structure 13 is formed as a recessed portion 13R and the alignment structure 23 is formed as a protruded portion 23P. In deviation from FIG. 11, it is also possible that the positioning structure 13 is formed as a protruded portion 13P and the alignment structure 23 is formed as a recessed portion 23R as shown for instance in FIGS. 7A to 8D.

Figure 12A:
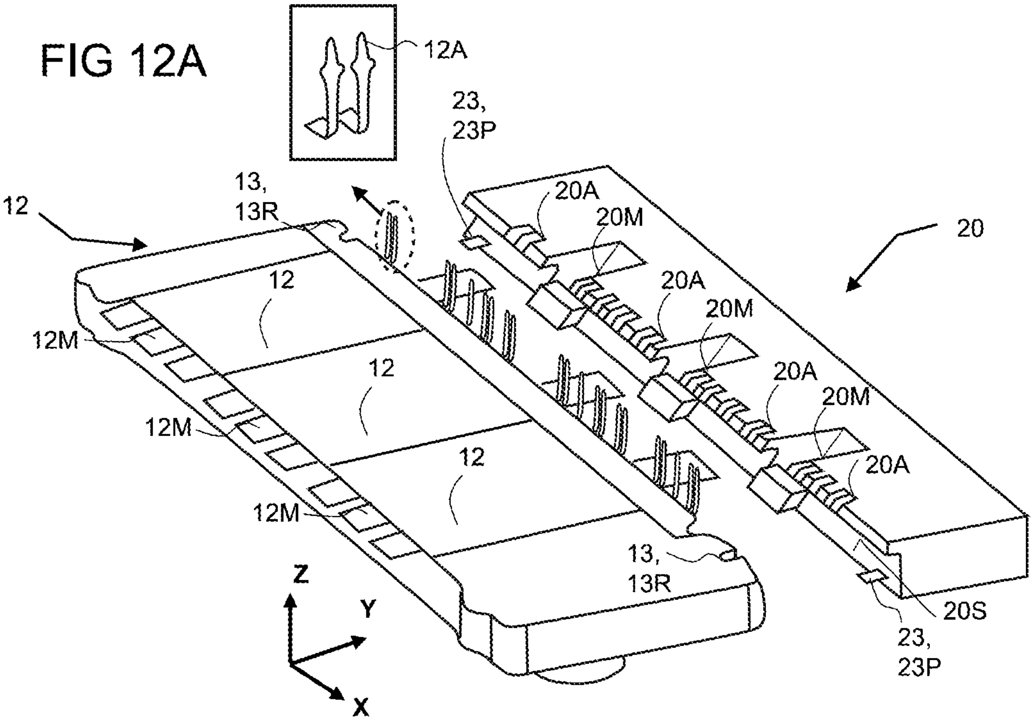
Figure 12B:
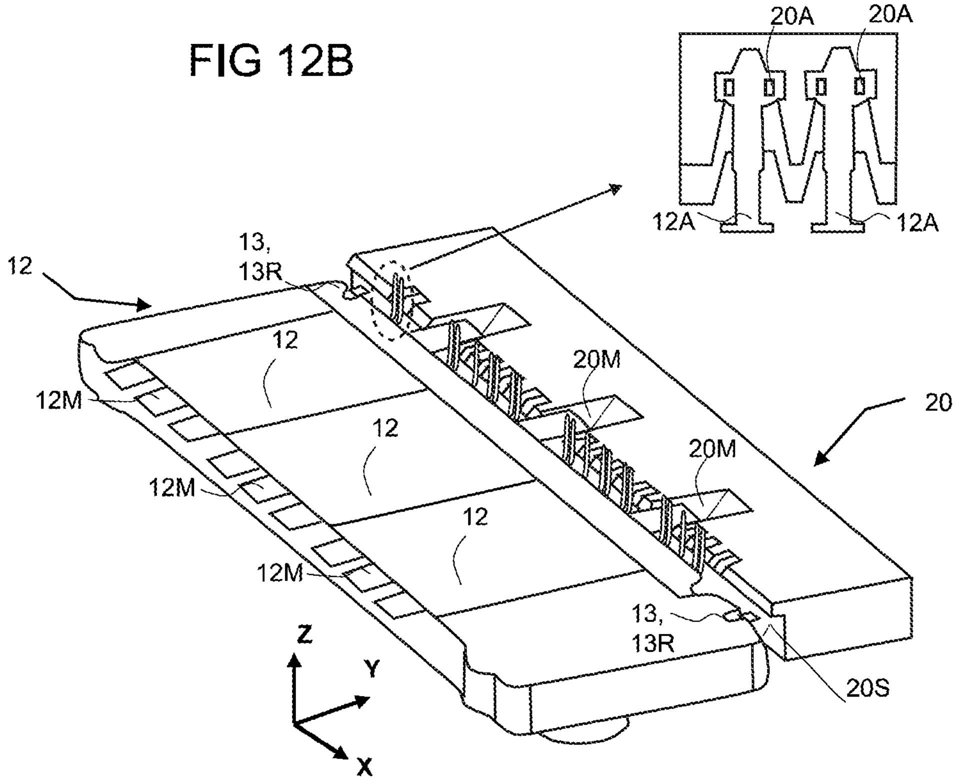

FIGS. 12A and 12B provide an overview of some method steps for positioning and aligning the power module 10 by using the alignment tool 20. The alignment tool 20 shown in FIG. 12A is also shown in FIG. 10A. According to FIGS. 12A and 12B, the power module 10 can comprise a plurality of module components 12, for example three module components 12. Each of the module components 12 can have a plurality of pin-shaped terminals 12A and at least one main terminal 12M.

According to FIG. 12A, the alignment tool 20 is positioned at the side surface 10S of the power module 10, wherein the alignment tool 20 has a side surface 20S comprising at least two alignment structures 23 realized as protruded portions. The alignment structures 23 are configured for docking at the positioning structures 13 on the side surface 10S of the power module 10, wherein the positioning structures 13 can be realized as recessed portions next to an upper edge. The vertical slots 20A and the recesses 20M of the alignment tool are configured to receive the pin-shaped terminals 12A and the main terminals 12M, respectively. It is possible that the vertical slots 20A may provide reception portions for cross-bars of the pin-shaped terminals 12A which are for instance press-fit terminals. Finally, this also provides a proper alignment and/or positioning of the pin-shaped terminals 12A in Z-direction.

According to FIG. 12A, the power module 10 has two positioning structures 13 for instance in the form of two recessed portions 13R situated at two lateral ends of the power module 10 next to an upper edge, for instance at two lateral ends of the carrier 11 of the power module 10. Thus, a special alignment feature between the alignment tool 20 and power module 10 can be realized which facilitates a simplified alignment procedure by applying a controlled movement of the alignment tool 20 in Y-direction and Z-direction.

The alignment feature can be realized by one or more sliding surfaces, for instance in the form of local oblique or curved surfaces or ramps. For example, the local oblique or curved ramps are realized by the geometry of one or more local recessed portions 13R of the power module 10, wherein the local recessed portions 13R comprise sliding surfaces or local ramps. Corresponding or complementary protruded portions 23P of the alignment tool 20 can be inserted into the recessed portions 13R.

According to FIG. 12B, the alignment structures 23 are inserted into the complementary positioning structures 13 or vice versa. For instance, at first, the recessed portions 13R of the power module 10 in combination with the protruded portions 23R of the alignment tool 20 can provide a good positioning in X-direction. Due to the for instance slot-like shape recessed portions 13R, the alignment tool 20 can be pushed for instance only in Y-direction. Sliding the alignment tool 20 along the Y-direction, the recessed portions 13R comprising the ramp structures automatically provide an additional movement of the power module 10 in the Z-direction for achieving an exact alignment of the terminals 12A in the Z-direction. In other words, the sliding of the alignment tool 20 along the lateral Y-direction is accompanied by a controlled movement of the power module 10 along the vertical Z-direction.

As described in connection with FIG. 9, the controlled movement of the power module 10 can be used for adjusting the positions of the pin-shaped terminals 12A relative to the positions of the contact holes 30H of the assembly board 30 and thus for inserting the pin-shaped terminals 12A into the contact holes 30H in simplified but efficient and secure manner. For example, mechanical support can be provided or enhanced by reception portions 20R for cross-bars 12B or on the bottom of the auxiliary terminals 12A (see FIG. 10B).

The present disclose suggests solutions for simplifying the process of mechanically and electrically fixing one or several power semiconductor modules 10, for instance molded power semiconductor modules, for example to an assembly board 30. The power semiconductor modules 10 may have pin-shaped auxiliary terminals 12A which are bent upwards in the vertical Z-direction. For the interconnection, the pin-shaped terminals 12A are inserted into corresponding openings or contact holes 30H of the assembly board 30. The fixation of the control terminals 12A to the assembly board 30 can be carried out e.g. by soldering or by using press-fit structures at the end portions of the auxiliary terminals 12A.

If the pin-shaped terminals 12A are formed as press-fit terminals 12A, in many cases, it might not be sufficient to provide a proper alignment only in X- and Y-directions. When the press-fit terminals 12A are inserted into the contact holes 30H, the press-fit terminals 12A including their horizontal sections are exposed to considerable mechanical forces. Thus, the press-fit terminals 12A require mechanical support to provide sufficient mechanical force for the insertion of the press-fit terminals 12A and to prevent an unwanted bending of the press-fit terminals 12A. This can be realized for instance by providing mechanical support at bottom surface of the reception portions 20R for receiving the cross-bars 12B or on the bottom of the auxiliary terminals 12A (see FIG. 10B). Furthermore, an alignment of the press-fit terminals 12A in Z-direction is desired to achieve a proper joining connection between press-fit terminals 12A and the contact holes 30H. Otherwise, the press-fit portions of the terminals 12A could be located below or above the assembly board 30, and in this case no proper mechanical and/or electrical interconnections would be achieved.

Using the power module 10 and the alignment tool 20 described here, proper alignment can be guaranteed, not only in the lateral X- and Y-directions but also in the vertical Z-direction. Thus, it can be prevented that some pin-shaped terminals 12A would be bent or displaced or not all pin-shaped terminals 12A would fit to the contact holes 30H of the assembly board 30.

The embodiments shown in the Figures as stated represent exemplary embodiments of the power module and of the alignment tool for positioning and aligning the power module; therefore, they do not constitute a complete list of all embodiments according to the improved arrangement for the power module or the alignment tool. Actual arrangements of the power module or of the alignment tool may vary from the exemplary embodiments described above.

REFERENCE SIGNS

10 power module
10S side surface of the power module
11 carrier
11S side surface of the carrier
12 module component
12A auxiliary terminal/pin-shaped terminal of the module component/power module
12B cross-bar
12M main terminal of the module component/power module
12H housing body of the module component
12S side surface of the module component
13 positioning structure of the power module
13L lateral length of the positioning structure
13H vertical height of the positioning structure
13W lateral width of the positioning structure
13P protruded portion on side surface of the power module
13R recessed portion on side surface of the power module
13S vertically oblique or curved surface of the positioning structure
131 first partial surface of the positioning structure
132 second partial surface of the positioning structure
133 third partial surface of the positioning structure
20 alignment tool
20A vertical slot of the alignment tool
20M recess of the alignment tool
20R reception portion of the alignment tool
20S side surface of the alignment tool
23 alignment structure of the alignment tool
23L lateral length of the alignment structure
23H vertical height of the alignment structure
23W lateral width of the alignment structure
23P protruded portion on side surface of the alignment tool
23R recessed portion on side surface of the alignment tool
23S vertically oblique or curved surface of the alignment structure
231 first partial surface of the alignment structure
232 second partial surface of the alignment structure
233 third partial surface of the alignment structure
30 assembly board
30H contact hole of the assembly board
30C contact layer
L lateral length of the positioning/alignment structure
H vertical height of the positioning/alignment structure
W lateral width of the positioning/alignment structure
X lateral direction/horizontal direction
Y lateral direction/longitudinal direction
Z vertical direction

What is claimed is:

1. A power module comprising at least one module component, wherein
the power module has a side surface,
the side surface of the power module comprises positioning structures, and
at least one of the positioning structures has a geometrical form configured for receiving an alignment tool and further configured for vertically moving the power module when sliding the alignment tool along a lateral direction, and
wherein
the at least one positioning structure has at least in places a vertically oblique or vertically curved surface, and/or
the at least one positioning structure is formed on a side surface of the at least one module component.

2. The power module according to claim 1, wherein the at least one positioning structure has at least in places the vertically oblique or vertically curved surface.

3. The power module according to claim 2, wherein the at least one positioning structure comprises a first plane partial surface and a second partial surface, wherein the second partial surface adjoins the first plane partial surface and forms a sliding surface provided by the vertically oblique or vertically curved surface.

4. The power module according to claim 1, wherein the at least one positioning structure is formed as a recessed portion on the side surface of the power module.

5. The power module according to claim 1, wherein the at least one positioning structure is formed as a protruded portion on the side surface of the power module.

6. The power module according to claim 1, comprising a carrier, wherein the at least one module component is arranged on the carrier, the carrier is a cooler or a heat sink, and the at least one positioning structure is formed on a side surface of the carrier.

7. The power module according to claim 1, wherein the at least one positioning structure is formed on the side surface of the at least one module component.

8. The power module according to claim 1, wherein the at least one positioning structure has a lateral width in a range from 1.5 mm to 15 mm, a lateral length in a range from 4 mm to 15 mm, and a vertical height in a range from 2 mm to 10 mm.

9. The power module according to claim 1, wherein the power module has at least one or several pin-shaped terminals each having a lateral portion and a vertical portion, and the at least one positioning structure has the geometrical form configured for sliding the alignment tool and for vertically moving the power module with respect to the alignment tool when sliding the alignment tool and thus for moving the at least one or the several pin-shaped terminals along a vertical direction.

10. A method for aligning a power module, comprising at least one module component, with respect to an assembly board using an alignment tool comprising:

positioning a side surface of the power module at a side surface of the alignment tool, wherein the side surface of the alignment tool comprises alignment structures, wherein at least one of the alignment structures is configured for docking at least one positioning structure on the side surface of the power module, inserting the at least one positioning structure into the at least one alignment structure or inserting the at least one alignment structure into the at least one positioning structure for aligning the power module with respect to the assembly board, resulting in a sliding of the alignment tool along a lateral direction with respect to the power module, wherein the sliding of the alignment tool along the lateral direction is accompanied by a controlled movement of the power module along a vertical direction with respect to the assembly board, and after the power module is aligned to the assembly board, the alignment tool is released from the power module, wherein the at least one positioning structure has at least in places a vertically oblique or vertically curved surface, and/or the at least one positioning structure is formed on a side surface of the at least one module component.

11. The method according to claim 10, wherein the power module has at least one pin-shaped terminal each having a lateral portion and a vertical portion, wherein the vertical portion is directed towards the assembly board, the assembly board comprises at least one contact hole for receiving the pin-shaped terminal, and the controlled movement of the power module is configured for adjusting the position of the pin-shaped terminal relative to the position of the contact hole and for inserting the pin-shaped terminal into the contact hole, and by carrying out the controlled movement of the power module, the power module is interconnected to the assembly board.

12. The method according to claim 11, wherein the side surface of the alignment tool comprises at least one vertical slot for receiving and fixing a lateral position of the at least one pin-shaped terminal.

13. The method according to claim 10, wherein the at least one positioning structure and the at least one alignment structure have mutually complementary geometrical forms, one of the at least one positioning structure and the at least one alignment structure is formed as a recessed portion, and the other one of the at least one positioning structure and the at least one alignment structure is formed as a protruded portion.

14. The method according to claim 10, wherein the at least one positioning structure has at least in places the vertically oblique or vertically curved surface.

15. The method according to claim 14, wherein the vertically oblique or vertically curved surface is used for sliding the alignment tool along the lateral direction resulting in the controlled movement of the power module along the vertical direction with respect to the alignment tool.

16. The method according to claim 14, wherein the at least one positioning structure comprises a first plane partial surface and a second partial surface, wherein the second partial surface adjoins the first plane partial surface and forms a sliding surface provided by the vertically oblique or vertically curved surface.

17. The method according to claim 10, wherein the at least one positioning structure is formed as a recessed portion on the side surface of the power module.

18. The method according to claim 10, wherein the at least one positioning structure is formed as a protruded portion on the side surface of the power module.

19. The method according to claim 10, wherein the at least one positioning structure is formed on the side surface of the at least one module component.

20. An alignment tool having a side surface comprising alignment structures, wherein at least one of the alignment structures is configured for docking at one positioning structure of the power module according to claim 1, and wherein the alignment tool is configured that when the at least one alignment structure slides on a surface of the power module along a lateral direction, the lateral movement of the alignment tool is accompanied by a controlled movement of the power module along a vertical direction with respect to the alignment tool.

* * * * *